(No Model.)
T. R. LEIGHTON.
NIPPLE HOLDING CHUCK.
No. 409,108. Patented Aug. 13, 1889.
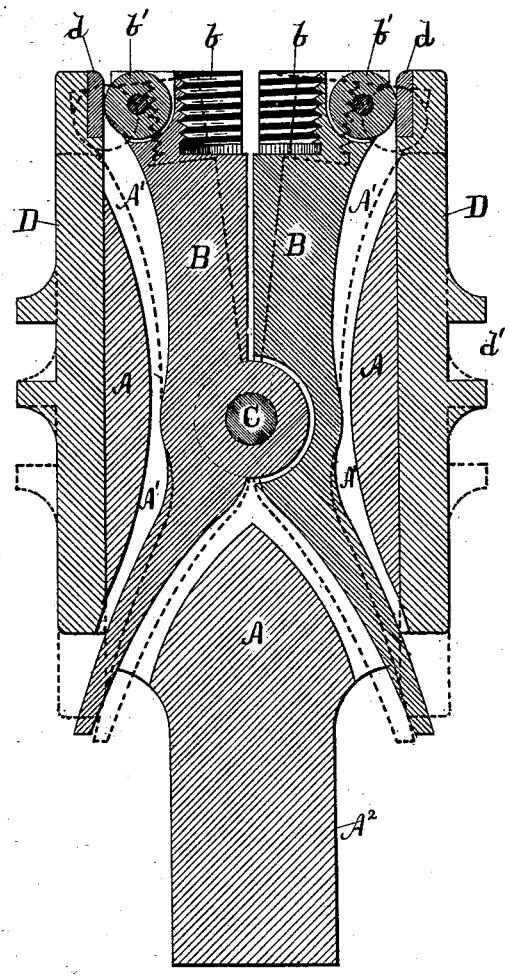

UNITED STATES PATENT OFFICE.

THOMAS R. LEIGHTON, OF ERIE, PENNSYLVANIA, ASSIGNOR TO THE JARECKI MANUFACTURING COMPANY, (LIMITED,) OF SAME PLACE.

NIPPLE-HOLDING CHUCK.

SPECIFICATION forming part of Letters Patent No. 409,108, dated August 13, 1889.

Application filed May 31, 1889. Serial No. 312,678. (No model.)

*To all whom it may concern:*

Be it known that I, THOMAS R. LEIGHTON, a citizen of the United States, residing at Erie, in the county of Erie and State of Pennsylvania, have invented certain new and useful Improvements in Nipple-Holding-Chucks; and I do hereby declare the following to be a full, clear, and exact description of the invention, such as will enable others skilled in the art to which it appertains to make and use the same.

This invention relates to nipple-holding chucks; and it consists in certain improvements in the construction thereof, as will be hereinafter fully set forth, and pointed out in the claim.

The invention is illustrated in the accompanying drawing by a single figure, which is a longitudinal sectional view, the changed position of the parts being shown by dotted lines.

The chuck consists of a body A, having a longitudinal chamber A', and a stem or shank A² within the longitudinal chamber A'. There are two pivoted jaws B B, which act like tongs or nippers. The pivot C, on which these jaws are pivoted, is a bolt which passes through the body A. The gripping-faces of the jaws are screw-threaded, as at b b, so as to grip a screw-threaded nipple. On the body A, which is cylindrical in form, is a sliding sleeve D, which is of less length than the levers B, which form the tongs or nippers above referred to. When this sleeve D is in the position shown in full lines, the jaws are brought together, and when the sleeve is in the position shown by dotted lines the jaws are thrown apart. If desired, friction-rollers b' are put in the jaws B at the point where the sleeve acts upon it, and a steel facing-ring d may be put on the sleeve, if desired.

The sleeve D may be moved by hand, or it may be acted upon by a shifting-lever, if desired. In the drawing, a groove d' is shown, in which the shifter may be adjusted when used. The action of the parts can be easily understood from the drawing, and requires no further explanation. The action of the chuck in grasping and releasing a nipple is very prompt, and the arrangement of parts is such that a nipple is certain to be held when grasped in an exactly concentric position.

What I claim as new is—

In a nipple-holding chuck, the combination, with the body A, having a longitudinal chamber A' therein, of pivoted nipper-levers B B, arranged within said chamber and having their ends protruding therefrom at both ends, and a sliding sleeve D, which embraces said body A and acts upon the said protruding ends of the nipper-levers as it is moved one way or the other and thereby opens or closes the said nippers.

In testimony whereof I affix my signature in presence of two witnesses.

THOMAS R. LEIGHTON.

Witnesses:
JNO. K. HALLOCK,
WM. P. HAYES.